United States Patent

[11] 3,588,333

[72] Inventors Edmond De Niet;
Pieter Damstra, Emmasingel, Eindhoven, Netherlands

[21] Appl. No. 624,943
[22] Filed Mar. 21, 1967
[45] Patented June 28, 1971
[32] Priority Mar. 26, 1966
[33] Netherlands
[31] 6,604,018

[54] DEVICE FOR MAGNETICALLY RECORDING AND READING A TELEVISION SIGNAL
9 Claims, 2 Drawing Figs.

[52] U.S. Cl. .......... 178/6.6, 178/71
[51] Int. Cl. .......... H04n 5/78
[50] Field of Search .......... 178/7.1, 7.1 (DC), 6.6 (A)(Inquired)

[56] References Cited
UNITED STATES PATENTS

| | | | |
|---|---|---|---|
| 2,281,891 | 5/1942 | Terry | 178/7.1DC |
| 2,369,614 | 2/1945 | Smith | 178/7.1 |
| 2,909,597 | 10/1959 | Johnson | 178/6.6A |
| 2,947,864 | 8/1960 | Johnson | 178/6.6A |
| 3,099,709 | 7/1963 | Barry | 178/6.6A |
| 3,246,080 | 4/1966 | Ritchey | 178/7.1DC |

*Primary Examiner*—Robert L. Griffin
*Assistant Examiner*—Joseph A. Orsino. Jr.
*Attorney*—Frank R. Trifari ABSTRACT: In a video recording system for television signals, the signals are provided with a reference level (e.g. midway between the maximum and minimum levels) during the back porch of the synchronizing period. The current through the magnetic recording head is set to be zero at the reference level. In the reproducing system, the output of the reproducing head is clamped at the time of occurrence of the reference level.

INVENTORS
EDMOND DE NIET
PIETER DAMSTRA
BY
Frank R. Trifari
AGENT

INVENTORS
EDMOND DE NIET
PIETER DAMSTRA
BY
Frank R. Trifari
AGENT

DEVICE FOR MAGNETICALLY RECORDING AND READING A TELEVISION SIGNAL

The invention relates to a device for magnetically recording and reading a television signal containing alternately videosignal portions and reference signal portions, while a recording head is provided for recording the television signal on a magnetic record carrier and the signal read from the magnetic record carrier is applied to a clamp by means of which the reference signal portions of the read television signal are brought to a fixed reference potential.

In devices for magnetically recording and reading a television signal in which the television signal is applied to a magnetic recording head by means of which the television signal is recorded on a magnetic record carrier, the lower frequencies of the signal read from the record carrier are considerably attenuated, while especially the direct-current component of the signal gets completely lost.

In general, the television signal consists beside the videosignal portions of reference signal portions, for example, the synchronizing pulses or the front or back porches of the synchronizing pulses by means of which the direct current component which has got lost during the magnetic recording and reading can be introduced again. For this purpose, the read television signal is applied to a clamp by which the reference signal portions are brought to a fixed reference potential preferably controlled by clamping pulses appearing synchronously with the reference signal portions.

An important problem arising in devices for recording and reading television signals consists in that a large number of interference and noise signals are added to the television signal due to the recording and reading process, especially the interference and noise signals of low frequency exerting a very unfavorable influence on the quality of the scene reproduced. The interference and noise signals are for a great part due to the fact that the record carrier has nonuniform magnetic properties, for example, since the thickness of the magnetic layer varies locally and since this layer has a grain structure which renders the magnetizability of the record carrier nonuniform.

The invention has for an object to provide a device by means of which the disturbing influence of the nonuniform thickness of the record carrier on the read television signal is considerably reduced and the device in accordance with the invention is characterized in that means are provided by which the reference signal portions of the television signal applied to the recording head during the recording process are brought to a level such that during said reference signal portions the signal current flowing through the recording head is at least approximately equal to zero.

The invention is based on recognition of the fact that the interference of the television signal is for a considerable part due to the interference or noise signals applied during the reference signal portions, the said interference or noise signals being transferred by means of the clamp to the videosignal portions and that this interference is considerably reduced by the step in accordance with the invention, since the recording and reading of the reference signal portions is thus rendered independent of the magnetic properties of the record carrier.

The invention will now be described more fully with reference to the FIGS. shown in the drawing, of which:

Figure 1:
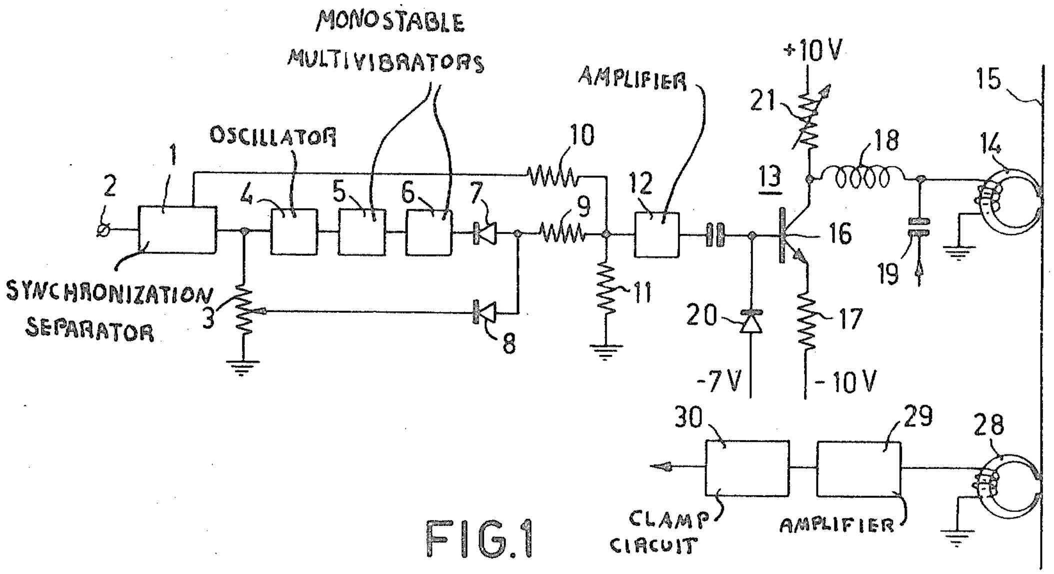
FIG. 1 shows an embodiment of a device according to the invention.
Figure 2:
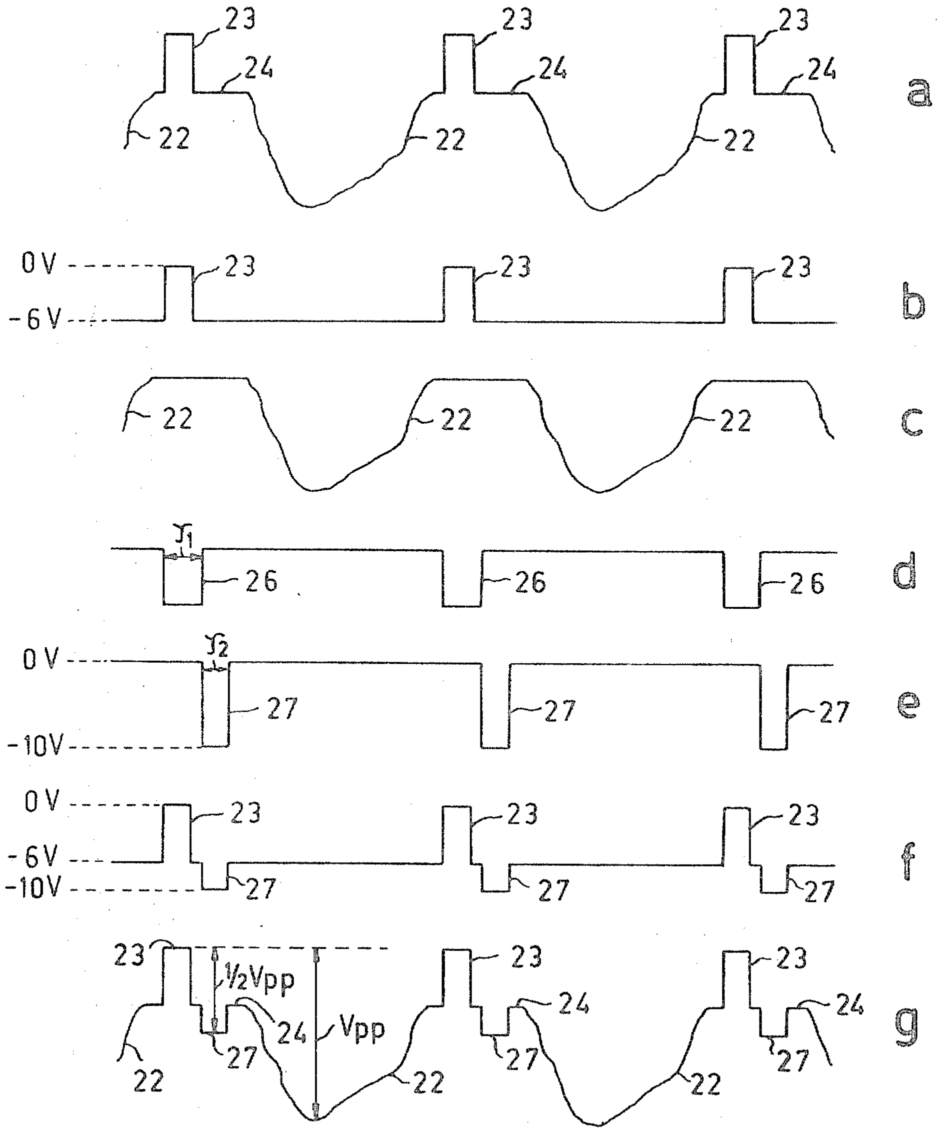
FIG. 2 illustrates a few voltage waveforms for explaining the operation of the device shown in FIG. 1.

The embodiment of FIG. 1 includes a synchronization separator 1 to the input 2 of which is applied the television signal to be recorded. This television signal is shown diagrammatically in FIG. 2*a* and contains inter alia videosignal portions 22 and line synchronizing pulses 23, while the back porches of the line synchronizing pulses are denoted by 24. The front and back porches of the synchronizing pulses lie at the so-called black level. In practice, the videosignal portion may cover approximately 70 percent of the peak-to-peak amplitude of the whole television signal and the synchronizing pulses may cover the remaining 30 percent.

With the aid of the synchronization separator 1, the videosignal portions 22 are separated from the synchronizing pulses (cf. FIGS. 2*b* and 2*c*) and the separated synchronizing pulses are applied to a potentiometer 3 and to an oscillator 4 the natural frequency of which is approximately equal to the repetition frequency of the line synchronizing pulses 23. The oscillator 4, which may consist, for example, of an astable multivibrator, is synchronized by the positive-going edges of the line synchronizing pulses 23. The output signal of the oscillator 4 controls a monostable multivibrator 5 having a time constant $\tau_1$ which gives off a pulse train designated by 26 in FIG. 2*d*. This multivibrator is excited at the instants coinciding with the positive-going edges of the line synchronizing pulses 23 and the width of the pulses 26 is determined by the time constant $\tau_1$ of the multivibrator.

The pulses 26 originating from the multivibrator 5 are applied to a second monostable multivibrator 6 having a time constant $\tau_2$ which is excited by the trailing edges (the positive-going edges) of the pulses 26. Therefore, the multivibrator 6 supplies pulses 27 (cf. FIG. 2*e*) the leading edges of which coincide with the trailing edges of the pulses 26 and the width of the pulses 27 is equal to the time constant $\tau_2$ of the multivibrator 6.

It should be noted that the multivibrator 5 may be directly controlled by the synchronizing pulses originating from the synchronization separator 1, hence without the interposition of the oscillator 4. However, it is desirable in many cases to include such an oscillator in order to prevent that a pulse 27 is produced due to equalizing pulses in the television signal. Moreover, the oscillator prevents that a transient dropout of the television signal results in a dropout of the pulses 27.

The pulses 27 obtained are mixed with a suitable amplitude with the synchronizing pulses at the tapping on the potentiometer 3 (FIG. 2*b*) in a gate circuit comprising two diodes 7 and 8 connected with the same polarity. If the amplitude of the pulses 27 is, for example, 10 v., the amplitude of the synchronizing pulses is chosen to be approximately equal to 6 v. Due to the effect of the two diodes 7 and 8, the output signal at the anodes of said diodes is at any instant equal to the input signal which is most negative at the relevant instant. Immediately before the appearance of a line synchronizing pulse 23, for example, the voltage applied to the diode 8 is −6 v. and the voltage applied to the diode 7 is 0 v. The output signal of the gate circuit is −6 v. During a line synchronizing pulse, the input voltages are both 0 v. so that the output voltage of the gate circuit is also 0 v. During the appearance of a pulse 27, the voltage applied to the diode 8 is −6 v. and the voltage applied to the diode 7 is −10 v. so that the output voltage of the gate circuit is −10 v. The output signal of the gate circuit 7,8 is shown in FIG. 2*f*.

In an adder circuit consisting of resistors 9, 10 and 11, the signal originating from the gate circuit 7,8 is then added to the videosignal portions 22 separated in the synchronization separator 1 (cf. FIG. 2*g*) and the television signal thus obtained is applied through a preamplifier 12 and an output amplifier 13 to a magnetic recording head 14 by means of which the television signal is recorded on a record carrier 15 which is displaceable with respect to said recording head.

The output amplifier 13 includes a transistor 16 having an emitter resistor 17 and the signal current flowing through the collector circuit of this transistor is applied through an inductor 18 to the recording head 14; moreover, a high frequency bias current is applied through a capacitor 19 to the head. A level diode 20 connected to the base electrode of the transistor 16 ensures that the peaks of the synchronizing pulses of the television signal applied to the recording head are kept at a constant level.

The embodiment of FIG. 1 further includes a magnetic reading head 28 which cooperates with the record carrier 15 and which serves to read the television signal recorded on this carrier. The read signal is amplified in an amplifier 29 and the reference signal portions of the read signal are then brought to a constant potential by means of a known clamp circuit 30 shown diagrammatically.

These reference signal portions are constituted by the back porches of the synchronizing pulses 23. As is apparent from the waveforms shown in FIG. 2, more particularly from the waveforms of FIGS. 2*a* and 2*g*, these back porches are brought by means of the pulses 27 to a level lying approximately midway between the peak value of the synchronizing pulses and the peak value of the videosignal portions. In other words, the reference signal portions lie approximately at half the peak-to-peak value $V_{pp}$ of the complete television signal. If therefore the record carrier is excited to the maximum, the current flowing through the recording head 14 is at a maximum in one direction during the synchronization peaks and at a maximum in the opposite direction during the peak-white portions of the videosignal; during the reference signal portions (pulses 27), the current flowing through the recording head is equal to zero so that during said parts the record carrier is not magnetized. Therefore, the recording and reading of said portions is fully independent of the magnetic properties of the record carrier so that, as already stated above, the operation of the clamp circuit 30 is not disturbed and consequently the signal-to-noise ratio of the read television signal is considerably improved.

As shown in FIG. 1, an adjustable resistor 21 connected to a direct-voltage source is connected to the collector electrode of the transistor 16. An adjustable direct current is passed through the recording head 14 by means of said resistor so that the level of the reference signal portions can be accurately adjusted so that during said parts no signal current flows through the recording head 14.

It should be noted that the reference signal portions (for example the back porches 24 of the synchronizing pulses in FIG. 2*a*) may be brought without using the pulses 27 by means of a direct current to a level such that during said parts no signal current flows through the recording head. This method has the disadvantage, however, that in this case the record carrier is not completely excited so that part of the signal-processing power of the carrier remains unemployed.

It should further be noted that, for example by adjusting the time constants $\tau_1$ and $\tau_2$ of the monostable multivibrators 5 and 6, the pulses 27 may be applied to any desired point and that these pulses may be adjusted to any desired width. If the pulses 27 cover, for example, only part of the back porches of the line synchronizing pulses (as shown in FIG. 2*g*), the remaining parts of said back porches can be used for the transmission of other information, for example, of a color synchronizing signal (color burst) or of a sound signal associated with the television signal.

Alternatively, the pulses 27 may cover completely the back porches of the line synchronizing pulses and any additional information may be contained in one or more parts of the pulses 27. However, the clamp 30 arranged in the reading channel is then preferably rendered operative only during those parts of the pulses 27 which do not contain this additional information. It should be noted in this connection that additional space for such additional information can be obtained by choosing the time constant $\tau_1$ of the multivibrator 5 to be smaller than the duration of the synchronizing pulses 23, in other words by ensuring that these pulses 27 begin before the termination of the synchronizing pulses 23. Thus, the width of the synchronizing pulses is reduced without the use of additional circuit elements, which involves a gain of space behind the synchronizing pulse. We claim:

1. A device for magnetically recording and reading a television signal containing alternately videosignal portions and reference signal portions, while a recording head is provided for recording the television signal on a magnetic record carrier and the signal read from the magnetic record carrier is applied to a terminal member by means of which the reference signal portions of the read television signal are brought to a fixed reference potential, characterized in that means are provided by which during the recording process a part of the reference signal portion of the television signal applied to the recording head is brought to a level substantially halfway between the levels of the peak value of the video signal portion and the peak value of the reference signal portion of said television signal; such that during said reference signal portions the signal current flowing through the recording head is approximately equal to zero.

2. A device as claimed in claim 1, characterized in that the said means include a device for producing pulses during the reference signal portions, which pulses are added to the television signal to be recorded with an amplitude such that during the reference signal portions the signal current flowing through the recording head is at least approximately equal to zero.

3. A device as claimed in claim 2, characterized in that during the recording process an adjustable direct current is applied to the recording head for the fine zero adjustment of the level of the signal current in the recording head during the reference signal portions.

4. A device as claimed in claim 2, characterized in that the pulses produced have a width such that they cover substantially completely the back porches of the line synchronizing pulses of the television signal and also part of the line synchronizing pulses themselves.

5. A system for recording and reproducing television signals of the type having alternate video signal portions and reference signal portions, comprising a source of said signals, a magnetic recording head, means for modifying said television signals to provide a reference level in part of said reference signal portions, said reference level being substantially halfway between the levels of the peak value of the video signal portion and the peak value of the reference signal portion, of said television signal, and means for applying said modified signals to said magnetic recording head whereby substantially no current flows in said recording head when said televisions signals are at said reference level.

6. The system of claim 5, wherein said means for applying said modified signals to said recording head comprises amplifier means having an output circuit connected to said recording head, and means for adjusting the direct current level in said output circuit.

7. The system of claim 5, comprising a magnetic reproducing head, and means for clamping the output of said reproducing head at instants of occurrence of said reference level during said reference signal portions of said television signal.

8. The system of claim 5, wherein said modifying means comprises means for separating said reference signal portions and said video signal portions from said television signals; a first monostable multivibrator controlled by said reference signal portion; a second monostable multivibrator controlled by said first monostable multivibrator; and means for combining the output of said second monostable multivibrator, said reference signal portions, and said videosignal portions to produce said modified signals.

9. The system of claim 8, wherein said modifying means further comprises an oscillator coupled between said first monostable multivibrator and said separating means.

PO-1050
(5/69)

UNITED STATES PATENT OFFICE
CERTIFICATE OF CORRECTION

Patent No. 3,588,333 Dated June 28, 1971

Inventor(s) EDMOND DE NIET ET AL

It is certified that error appears in the above-identified patent and that said Letters Patent are hereby corrected as shown below:

IN THE TITLE PAGE below "Patented" insert -- Assignee: U.S. Philips Corporation by mesne Assignment --;

Signed and sealed this 18th day of February 1975.

(SEAL)
Attest:

RUTH C. MASON
Attesting Officer

C. MARSHALL DANN
Commissioner of Patents and Trademarks